(12) United States Patent
Kawamura et al.

(10) Patent No.: US 12,273,005 B2
(45) Date of Patent: Apr. 8, 2025

(54) ROTARY ELECTRIC MACHINE

(71) Applicant: HONDA MOTOR CO., LTD., Tokyo (JP)

(72) Inventors: Yasuhiro Kawamura, Saitama (JP); Yukihiro Wakihata, Saitama (JP); Hiroki Tanaka, Saitama (JP); Koshiro Baba, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 194 days.

(21) Appl. No.: 18/099,647

(22) Filed: Jan. 20, 2023

(65) Prior Publication Data

US 2023/0238852 A1 Jul. 27, 2023

(30) Foreign Application Priority Data

Jan. 24, 2022 (JP) ................... 2022-008959

(51) Int. Cl.
| | | |
|---|---|---|
| *H02K 5/16* | (2006.01) | |
| *H02K 5/173* | (2006.01) | |
| *H02K 5/20* | (2006.01) | |
| *H02K 7/08* | (2006.01) | |
| *H02K 9/197* | (2006.01) | |
| *H02K 11/01* | (2016.01) | |

(Continued)

(52) U.S. Cl.
CPC .......... *H02K 5/1732* (2013.01); *H02K 5/203* (2021.01); *H02K 7/083* (2013.01); *H02K 9/197* (2013.01); *H02K 11/225* (2016.01); *H02K 24/00* (2013.01)

(58) Field of Classification Search
CPC .......... H02K 5/16; H02K 5/161; H02K 5/165; H02K 5/1732; H02K 5/1737; H02K 5/173; H02K 5/20; H02K 5/203; H02K 7/083; H02K 7/08; H02K 7/086; H02K 9/197; H02K 9/19; H02K 11/01; H02K 11/012; H02K 11/014; H02K 11/0141; H02K 11/21; H02K 11/225; H02K 24/00
See application file for complete search history.

(56) References Cited

U.S. PATENT DOCUMENTS 3,612,726 A * 10/1971 Yowell ................. H02K 5/1732
  417/370
5,238,166 A * 8/1993 Schwarstein .......... H02K 5/124
  384/480

(Continued)

FOREIGN PATENT DOCUMENTS

CN   109067071 A  * 12/2018
CN   112713691 A  *  4/2021
(Continued)

OTHER PUBLICATIONS

Aug. 8, 2023, Translation of Japanese Office Action issued for related JP Application No. 2022-008959.

*Primary Examiner* — Edgardo San Martin
(74) *Attorney, Agent, or Firm* — Paratus Law Group, PLLC

(57) ABSTRACT

A rotary electric machine includes a rotor shaft, a rotor attached to the rotor shaft, a stator, and a case that houses the rotor and the stator. One end side and the other end side of the rotor shaft in an axial direction are respectively supported by the case via bearings with the rotor interposed therebetween. The bearings electrically insulate the rotor shaft and the case from each other.

8 Claims, 4 Drawing Sheets

(51) Int. Cl.
*H02K 11/225* (2016.01)
*H02K 24/00* (2006.01)

(56) References Cited

U.S. PATENT DOCUMENTS

| | | | | |
|---|---|---|---|---|
| 6,172,436 | B1 * | 1/2001 | Subler | F16C 33/6662 |
| | | | | 310/90 |
| 8,912,694 | B2 * | 12/2014 | Miura | H02K 5/203 |
| | | | | 310/58 |
| 9,673,678 | B2 * | 6/2017 | Okada | H02K 5/08 |
| 9,866,091 | B2 * | 1/2018 | Ishimaru | H02K 5/15 |
| 2012/0146436 | A1 * | 6/2012 | Garriga | H02K 5/203 |
| | | | | 310/53 |
| 2016/0248293 | A1 | 8/2016 | Takeno et al. | |

FOREIGN PATENT DOCUMENTS

| | | | | | |
|---|---|---|---|---|---|
| CN | 112803648 | A | * | 5/2021 | F04D 25/08 |
| CN | 113964999 | A | * | 1/2022 | |
| CN | 111130289 | B | * | 3/2022 | F16C 33/6659 |
| CN | 117595575 | A | * | 2/2024 | |
| CN | 118020237 | A | * | 5/2024 | H02K 1/32 |
| DE | 102014014770 | A1 | * | 4/2016 | H02K 5/1732 |
| DE | 102019209048 | A1 | * | 12/2020 | |
| EP | 2696479 | A1 | * | 2/2014 | H02K 5/173 |
| JP | H04-156246 | A | | 5/1992 | |
| JP | 3612879 | B2 | * | 1/2005 | F16C 35/073 |
| JP | 3635948 | B2 | * | 4/2005 | F16C 35/077 |
| JP | 2012-060880 | A | | 3/2012 | |
| JP | 2014087121 | A | * | 5/2014 | |
| JP | 2016-077117 | A | | 5/2016 | |
| JP | 2016-158437 | A | | 9/2016 | |
| JP | 2020-089226 | A | | 6/2020 | |
| JP | 2021-125896 | A | | 8/2021 | |
| WO | WO-2014082682 | A1 | * | 6/2014 | H02K 15/0006 |

\* cited by examiner

ROTARY ELECTRIC MACHINE

CROSS-REFERENCE TO RELATED APPLICATION

The present application claims priority from Japanese Patent Application No. 2022-008959 filed on Jan. 24, 2022, the entire content of which is incorporated herein by reference.

TECHNICAL FIELD

The present invention relates to a rotary electric machine.

BACKGROUND ART

In recent years, as a concrete countermeasure against global climate change, efforts toward realization of a low-carbon society or a decarbonized society are activated. Also in moving objects such as vehicles, a reduction in $CO_2$ emission and improvement of energy efficiency are strongly required, and a drive source is rapidly electrified. Specifically, a vehicle such as an electrical vehicle or a hybrid electrical vehicle, which includes an electric motor as a drive source of the vehicle, and a battery as a secondary battery capable of supplying power to the electric motor, are now under development.

In a rotary electric machine such as an electric motor or a generator, an axial current may be generated with rotation of the rotary electric machine. In particular, a rotary electric machine having a high rotation speed and a high output power is easily affected by the axial current. For example, in a rotary electric machine described in JPH04-156246A, it is disclosed that a side plate of a frame (case) is divided into an outer side plate and an inner side plate, and an insulator is interposed therebetween to prevent electric corrosion of a bearing due to an axial current.

SUMMARY

However, in the countermeasure against the axial current described in JPH04-156246A, the number of components increases and there is room for improvement.

The present invention provides a rotary electric machine capable of appropriately preventing the axial current.

According to the present invention, there is provided a rotary electric machine including a rotor shaft, a rotor attached to the rotor shaft, a stator, and a case that houses the rotor and the stator. One end side and the other end side of the rotor shaft in an axial direction are respectively supported by the case via bearings with the rotor interposed therebetween. The bearings electrically insulate the rotor shaft and the case from each other.

According to the present invention, the axial current can be prevented from being generated in accordance with an operation of the rotary electric machine.

BRIEF DESCRIPTION OF DRAWINGS

Exemplary embodiment of the present invention will be described in detail based on the following figures, wherein.

DESCRIPTION OF EMBODIMENTS

Figure 1:
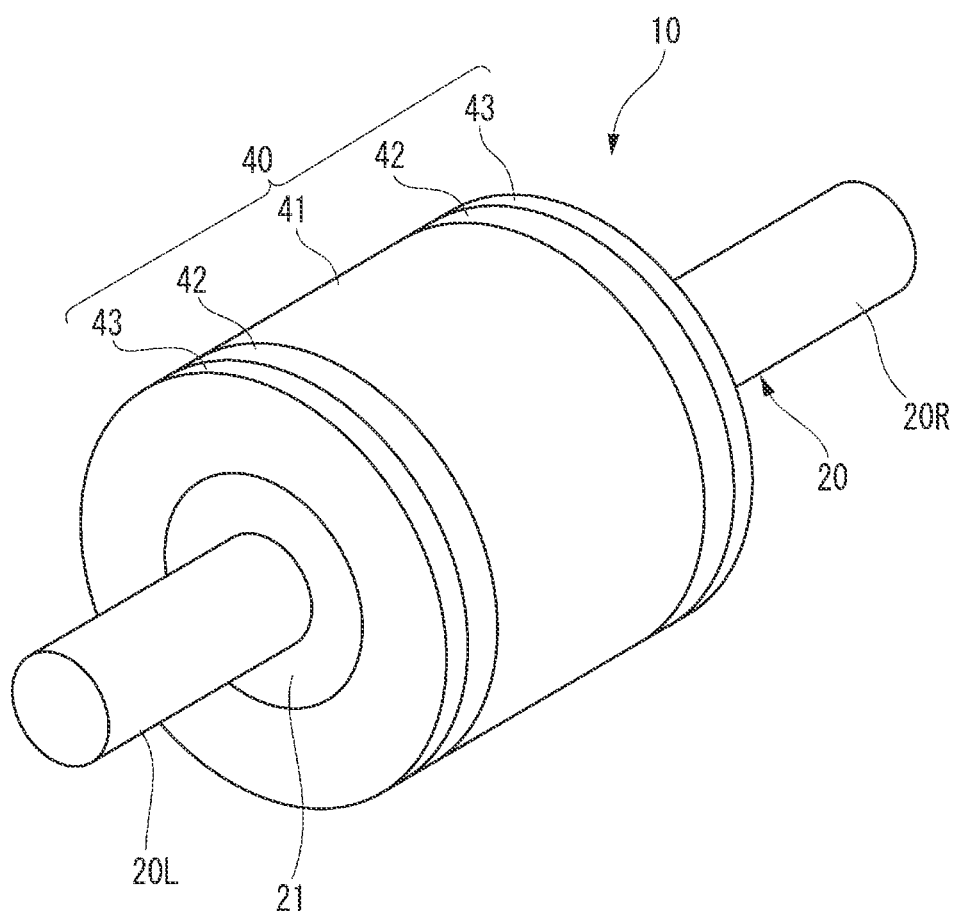
FIG. 1 is a perspective view of a motor 10.
Figure 2:
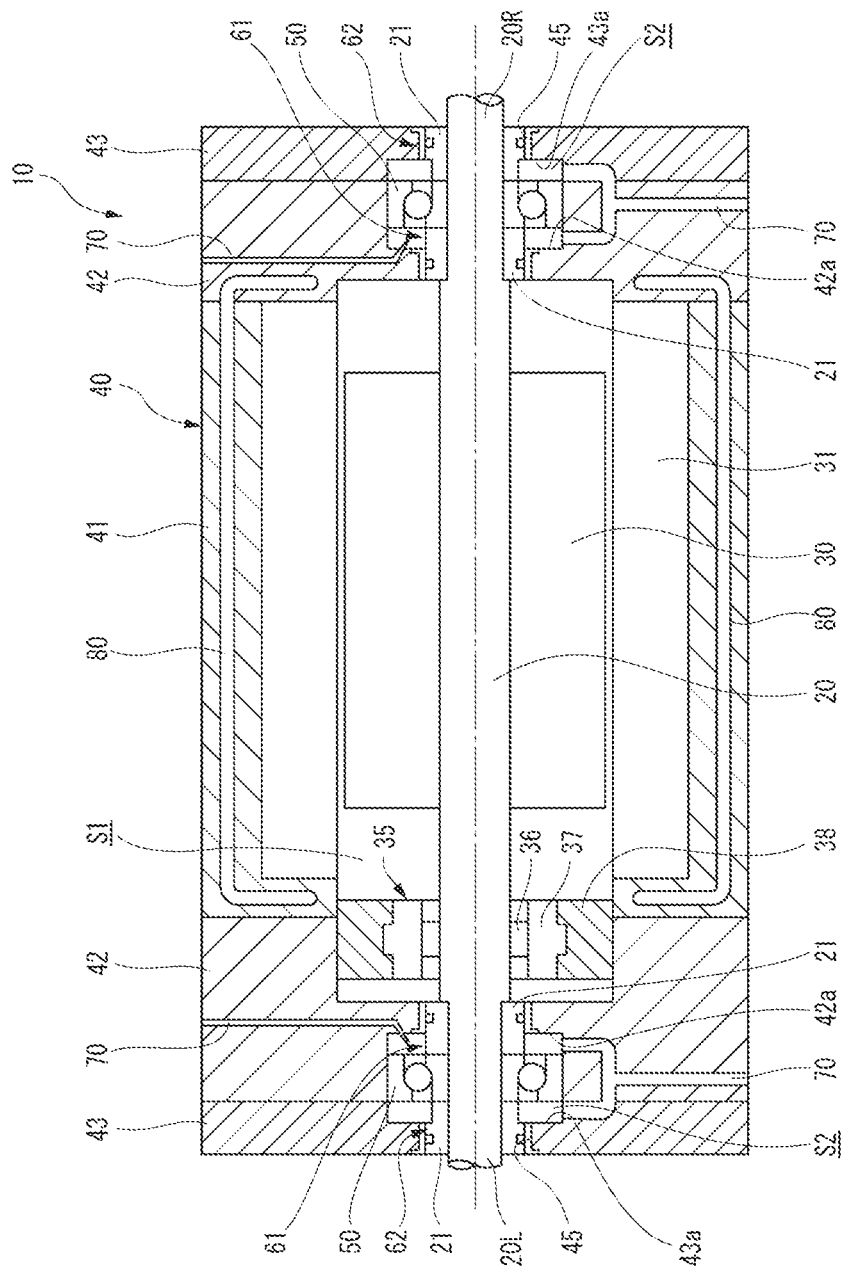
FIG. 2 is a cross-sectional view of the motor 10.

Hereinafter, an embodiment of a rotary electric machine of the present invention will be described with reference to the drawings. As shown in FIGS. 1 and 2, a motor 10 that is an embodiment of the rotary electric machine of the present invention includes a rotor shaft 20, a rotor 30 attached to the rotor shaft 20 so as to rotate integrally with the rotor shaft 20, a stator 31 disposed on an outer peripheral side of the rotor 30 so as to face the rotor 30 with a gap therebetween, a case 40 that houses the rotor 30 and the stator 31, and a pair of bearings 50 that are disposed on one end side and the other end side in an axial direction with the rotor 30 interposed therebetween and rotatably support the rotor shaft 20 with respect to the case 40.

The entire case 40 has a cylindrical shape and includes a cylindrical main case 41 fitted to an outer periphery of the stator 31, plate-shaped and disk-shaped side cases 42 disposed on the one end side and the other end side in the axial direction with the main case 41 interposed therebetween, and thin plate-shaped and disk-shaped end cases 43 disposed on the one end side and the other end side in the axial direction with the side cases 42 interposed therebetween.

The pair of bearings 50 are respectively disposed on inner peripheral portions of the side cases 42, and one end portion 20L and the other end portion 20R of the rotor shaft 20 are exposed to the outside from shaft holes 45 of the end cases 43. Each of the bearings 50 is positioned by a first seal mechanism 61 that abuts against a stepped portion of the rotor shaft 20 and a second seal mechanism 62 disposed on the opposite side of the first seal mechanism 61 in the axial direction with the bearing 50 interposed therebetween.

The pair of first seal mechanisms 61 are respectively disposed on the inner peripheral portions of the side cases 42, and the pair of second seal mechanisms 62 are respectively disposed on inner peripheral portions of the end cases 43.

In the case 40 configured as described above, a rotor housing space S1 sealed by the pair of first seal mechanisms 61 and a pair of bearing housing spaces S2 disposed on the one end side and the other end side in the axial direction with the rotor housing space S1 interposed therebetween and each sealed by the first seal mechanism 61 and the second seal mechanism 62 are formed.

More specifically, the rotor housing space S1 is a space surrounded by the rotor shaft 20, the main case 41, the pair of side cases 42, and the pair of first seal mechanisms 61, and houses the rotor 30 and the stator 31. The bearing housing space S2 is a space surrounded by the rotor shaft 20, an annular cutout portion 42a formed in the side case 42, an annular cutout portion 43a formed in the end case 43, the first seal mechanism 61, and the second seal mechanism 62, and the bearing 50 is disposed in the bearing housing space S2. In the rotor housing space S1, a liquid medium cannot move from the bearing housing space S2 by the first seal mechanism 61, and the bearing housing space S2 is liquid-tightly sealed from the outside by the first seal mechanism 61 and the second seal mechanism 62. An oil flow path 70, which will be described later, communicates with the bearing housing space S2.

Here, the first seal mechanism 61 and the second seal mechanism 62 will be described. Since the first seal mechanism 61 and the second seal mechanism 62 have the same configuration, only the first seal mechanism 61 will be described. Since the first seal mechanisms 61 have a line-symmetric configuration with respect to the rotor 30 on the one end side and the other end side with the rotor 30 interposed therebetween, the first seal mechanism 61 on the one end side (left side in FIG. 2) will be described with reference to FIG. 3 as an example.

Figure 3:
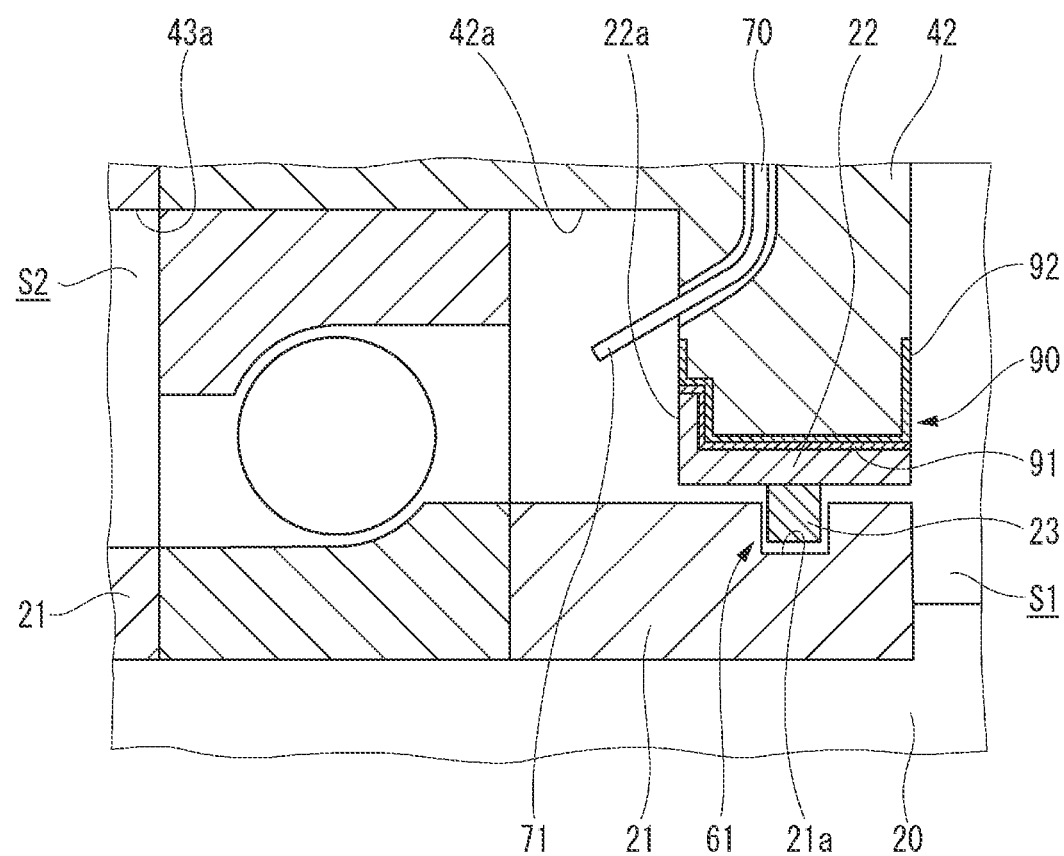
FIG. 3 is a partially enlarged view of FIG. 2.

As shown in FIG. 3, the first seal mechanism 61 includes a runner 21 attached to the rotor shaft 20 so as to rotate integrally with the rotor shaft 20, a sleeve 22 disposed on an outer peripheral side of the runner 21 so as to face the runner 21 with a predetermined gap therebetween, and a seal member 23 attached to an inner peripheral portion of the sleeve 22.

On an outer peripheral surface of the runner 21, a groove portion 21a having a rectangular cross section is provided in an annular shape. A flange 22a is provided at one end of the sleeve 22, and the sleeve 22 is attached to the side case 42 such that the seal member 23 is housed in the groove portion 21a of the runner 21. The seal member 23 is, for example, a seal ring in which a plurality of C-shaped ring members are arranged in the axial direction. In the first seal mechanism 61, the rotatable runner 21 faces the fixed sleeve 22 and seal member 23 with a predetermined gap therebetween. This restricts the movement of a liquid medium between one side and the other side of the seal member 23 while allowing the runner 21 that rotates integrally with the rotor shall 20 to rotate.

An oil jet nozzle 71 extending from the oil flow path 70 formed in the side case 42 is provided in the bearing housing space S2. The bearing 50 disposed in the bearing housing space S2 is lubricated by an oil injected from the oil jet nozzle 71. As a result, the bearing 50 is prevented from being damaged even under a high load and/or high rotation speed environment, and the hearing 50 can be used under a high load and/or high rotation speed environment.

On the other hand, a liquid medium such as oil is not supplied to the rotor housing space S1 liquid-tightly sealed from the bearing housing space S2 by the first seal mechanism 61, and the liquid medium is not housed in the rotor housing space S1. As a result, friction due to the liquid medium does not occur even when the rotor 30 rotates, and the rotor 30 can be rotated under a high load and/or high rotation speed environment.

Returning to FIG. 2, in the main case 41, a water jacket 80 for cooling the stator 31 is formed on the opposite side of the rotor 30 with respect to the stator 31. Even if no liquid medium is supplied to the rotor housing space S1, the stator 31 that generates heat while the motor 10 is being driven and a coil (not shown) wound around the stator 31 can be cooled by a refrigerant supplied to the water jacket 80, and a temperature rise in the case 40 can be prevented.

Figure 4:
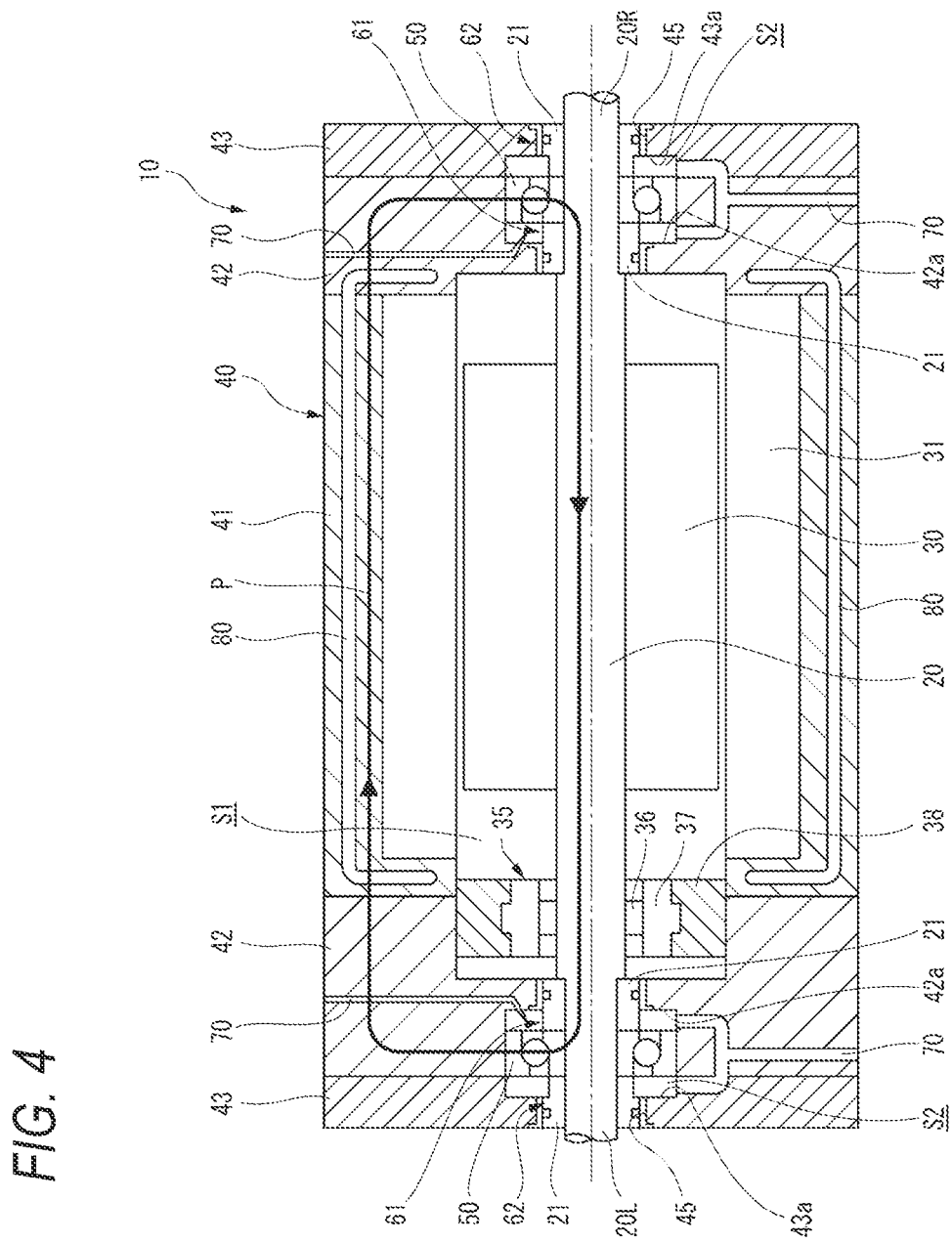
FIG. 4 is a diagram showing a path of an axial current generated in accordance with an operation of the motor 10.

The motor 10 configured as described above is assumed to be used in a high load and/or high rotation speed environment. However, particularly in a high load and/or high rotation speed environment, the rotatable rotor shaft 20 and the fixed case 40 are electrically connected to each other via the bearing 50, and thus an axial current may be generated in the motor 10. An arrow P in FIG. 4 indicates a path of the axial current generated in accordance with an operation of the motor 10.

Therefore, the bearing 50 is configured to electrically insulate the rotor shaft 20 and the case 40 from each other. As an insulating method, a part or all of the bearing 50 may be subjected to an insulating treatment, or a part or all of the bearing 50 may be formed of an insulator. For example, a rolling element of the bearing 50 may be a ceramic ball. The insulating treatment and/or a material of the insulator is not particularly limited, and PTFE, glass fibers, aluminum oxide ($Al_2O_3$) ceramics, silicon nitride ($Si_3N_4$) ceramics, and the like can be used. Accordingly, since the bearing electrically insulates the rotor shaft 20 and the case 40 from each other, the axial current can be prevented from being generated in accordance with an operation of the motor 10.

In addition, the rotor shaft 20 and the case 40 are electrically connected to each other not only via the bearing 50 but also via the first seal mechanism 61 and/or the second seal mechanism 62, so that the axial current may be generated in the motor 10. Normally, since a thrust gap is provided in the axial direction between the seal member 23 of the first seal mechanism 61 and/or the second seal mechanism 62 and the groove portion 21a of the runner 21, the seal member 23 and the groove portion 21a do not conduct with each other. However, when the rotor shaft 20 is displaced or vibrated in the axial direction while the motor 10 is being driven, the seal member 23 and the groove portion 21a may come into contact with each other and conduct with each other.

Therefore, the first seal mechanism 61 and the second seal mechanism 62 are configured to electrically insulate the rotor shaft 20 and the case 40 (the side case 42 in the first seal mechanism 61 and the end case 43 in the second seal mechanism 62) from each other. Specifically, an electrical insulating portion 90 is provided between the sleeve 22 and the case 40 that holds the sleeve 22. In the present embodiment, the electrical insulating portion 90 includes a first electrical insulating layer 91 provided at a portion of the sleeve 22 facing the case 40, and a second electrical insulating layer 92 provided at a portion of the case 40 facing the sleeve 22. By forming the electrical insulating portion 90 to have a multilayer structure, the axial current can be more appropriately prevented.

The electrical insulating portion 90 may include only one of the first electrical insulating layer 91 and the second electrical insulating layer 92. By providing the first electrical insulating layer 91 on the sleeve 22 separate from the case 40, an electrical insulating layer can be formed more easily than when the electrical insulating layer is disposed on the case 40. On the other hand, by disposing the second electrical insulating layer 92 on the case 40, it is possible to more reliably prevent the axial current passing through the case 40 from being generated in accordance with an operation of the motor 10.

As described above, since the first seal mechanism 61 and the second seal mechanism 62 are configured to electrically insulate the rotor shaft 20 and the case 40 from each other, even when the rotor shaft 20 comes into contact with the seal member 23, the axial current can be prevented from being generated in accordance with an operation of the motor 10 as the sleeve 22 and the case 40 are insulated from each other. Since the electrical insulating portion 90 is provided between the sleeve 22 and the case 40, which are both fixed, the electrical insulating portion 90 can be prevented from being damaged in accordance with the rotation of the rotor shaft 20.

In addition, by preventing the axial current from being generated, sensor noises are prevented from being generated. Therefore, sensors can be disposed in the vicinity of the rotor 30. In the present embodiment, as shown in FIG. 2, a resolver 35, which is a rotation sensor that acquires a rotation state of the rotor 30, is disposed in the rotor housing space S1. More specifically, the resolver 35 is disposed on one end side (left side in the drawing) of the rotor 30 in the rotor housing space S1, that is, between the first seal mechanism 61 on the one end side (left side in the drawing) in the axial direction and the rotor 30. The resolver 35 includes a resolver rotor 36 attached to the rotor shaft 20 so as to rotate integrally with the rotor shaft 20, a resolver stator 37 disposed on an outer peripheral side of the resolver rotor 36 so as to face the resolver rotor 36, and a resolver holder 38 that is attached to the main case 41 and the side case 42 and holds the resolver stator 37.

In the related art, the resolver 35 is generally disposed away from the rotor 30 in order to suppress the influence of sensor noises. However, by taking insulation countermeasures as described above, it is possible to prevent the sensor noises even when the resolver 35 is disposed in the vicinity of the rotor 30. Accordingly, according to the present invention, the degree of freedom in layout of the resolver 35 is improved, and the motor 10 can be downsized.

Although the embodiment is described above with reference to the drawings, it is needless to say that the present invention is not limited to such an example. It is apparent that those skilled in the art can conceive of various changes and modifications within the scope of the claims, and it is understood that such changes and modifications naturally fall within the technical scope of the present invention. In addition, constituent elements in the above embodiments may be combined freely within a range not departing from the spirit of the invention.

For example, insulation properties can be further improved by replacing the rotor shaft 20, the runner 21, the sleeve 22, and the seal member 23 with insulating materials or materials subjected to an insulating treatment. In addition, providing the main case 41, the side case 42, and the end case 43 with a structure for blocking the loop of the axial current also contributes to further improving the insulation properties.

In the above embodiment, the seal member 23 faces the runner 21 that rotates integrally with the rotor shaft 20, and is disposed to seal between the seal member 23 and the runner 21, but the runner 21 is not necessarily required, and the seal member 23 may face the rotor shaft 20 to seal between the seal member 23 and the rotor shaft 20.

In the present specification, at least the following matters are described. Although corresponding components and the like in the above embodiment are shown in parentheses, the present invention is not limited thereto.

(1) A rotary electric machine (motor 10) including:
a rotor shaft (a rotor shaft 20);
a rotor (rotor 30) attached to the rotor shaft;
a stator (stator 31); and
a case (case 40) that houses the rotor and the stator, in which
one end side and the other end side of the rotor shaft in an axial direction are supported by the case via respective bearings (bearings 50) with the rotor interposed therebetween, and
the bearings electrically insulate the rotor shaft and the case from each other.

According to (1), since the bearings electrically insulate the rotor shaft and the case from each other, an axial current can be prevented from being generated in accordance with an operation of the rotary electric machine.

(2) The rotary electric machine according to (1), in which
the case includes a rotor housing space (rotor housing space S1) that houses the rotor and the stator, and bearing housing spaces (bearing housing spaces S2) in which the bearings are disposed,
the rotor housing space and the bearing housing spaces are liquid-tightly sealed to each other by first seal mechanisms (first seal mechanisms 61), and
the bearing is lubricated by a liquid medium supplied to the bearing housing space.

According to (2), since the bearing is lubricated by the liquid medium supplied to the bearing housing space, the bearing can be used under a high load and/or high rotation speed environment.

(3) The rotary electric machine according to (2), in which
the rotor housing space is configured such that no liquid medium is supplied to the rotor housing space.

According to (3), since no liquid medium is supplied to the rotor housing space, the rotor can be rotated under a high load and/or high rotation speed environment.

(4) The rotary electric machine according to (2) or (3), in which
the first seal mechanisms electrically insulate the rotor shaft and the case from each other.

According to (4), since the rotor shaft and the case are insulated from each other by the first seal mechanisms as well, the axial current can be prevented from being generated in accordance with an operation of the rotary electric machine.

(5) The rotary electric machine according to (4), further including:
a rotation state acquisition unit (resolver 35) configured to acquire a rotation state of the rotor, in which
the rotation state acquisition unit is disposed between the first seal mechanism and the rotor in the axial direction.

According to (5), since the rotation state acquisition unit is installed in a region in which the axial current is prevented from being generated, it is possible to suppress the influence of the axial current and acquire the rotation state of the rotary electric machine. In the related art, in order to suppress the influence of sensor noises, it is necessary to dispose the rotation state acquisition unit away from the rotor. However, by taking insulation countermeasures, it is possible to prevent the sensor noises, and the degree of freedom of layout is improved. As a result, the rotary electric machine can be downsized.

(6) The rotary electric machine according to (5), in which
second seal mechanisms (second seal mechanisms 62) are disposed on sides opposite to the rotor with respect to the bearings in the axial direction, and
the second seal mechanisms electrically insulate the rotor shaft and the case from each other.

According to (6), since the rotor shaft and the case are insulated from each other by the second seal mechanisms as well, the axial current can be prevented from being generated in accordance with an operation of the rotary electric machine.

(7) The rotary electric machine according to (6), in which
the first seal mechanism and the second seal mechanism each includes
a seal portion (seal member 23) that faces the rotor shaft or a rotary member rotating integrally with the rotor shaft, and
a seal holding portion (sleeve 22) that is disposed on an outer peripheral side of the seal portion and holds the seal portion, and
an electrical insulating portion (electrical insulating portion 90) is provided between the seal holding portion and the case.

According to (7), even when the rotor shaft comes into contact with the seal portion, the axial current can be prevented from being generated in accordance with an operation of the rotary electric machine since the seal holding portion and the case are insulated from each other. In addition, since the electrical insulating portion is provided between the seal holding portion and the case, the electrical insulating portion can be prevented from being damaged.

(8) The rotary electric machine according to (7), in which the electrical insulating portion includes a first electrical insulating layer (first electrical insulating layer 91) provided at a portion of the seal holding portion facing the case.

According to (8), since the first electrical insulating layer is disposed in the seal holding portion separate from the case, an electrical insulating layer can be formed more easily than when the electrical insulating layer is disposed on the case.

(9) The rotary electric machine according to (7) or (8), in which the electrical insulating portion includes a second electrical insulating layer (second electrical insulating layer 92) provided at a portion of the case facing the seal holding portion.

According to (9), since the second electrical insulating layer is provided on the case, the axial current passing through the case can be prevented from being generated in accordance with an operation of the rotary electric machine.

(10) The rotary electric machine according to any one of (1) to (9), in which the case includes a cooling portion (water jacket 80) that is provided on the opposite side of the rotor with respect to the stator and cools the stator.

According to (10), it is possible to prevent a temperature rise in the case even if no liquid medium is supplied to the rotor housing space that houses the stator and the rotor, and use under a high load and/or high rotation speed environment is possible.

What is claimed is:

1. A rotary electric machine comprising:
   a rotor shaft;
   a rotor attached to the rotor shaft;
   a stator; and
   a case that houses the rotor and the stator, wherein
   one end side and an other end side of the rotor shaft in an axial direction are respectively supported by the case via bearings with the rotor interposed therebetween,
   the bearings electrically insulate the rotor shaft and the case from each other,
   the case includes:
     a rotor housing space that houses the rotor and the stator; and
     bearing housing spaces in which the bearings are disposed,
   the rotor housing space and the bearing housing spaces are liquid-tightly sealed to each other by first seal mechanisms,
   the bearing is lubricated by a liquid medium supplied to the bearing housing space, and
   the rotor housing space is configured such that no liquid medium is supplied to the rotor housing space.

2. The rotary electric machine according to claim 1, wherein
   the first seal mechanisms electrically insulate the rotor shaft and the case from each other.

3. The rotary electric machine according to claim 2, further comprising:
   a rotation state acquisition unit configured to acquire a rotation state of the rotor, wherein
   the rotation state acquisition unit is disposed between the first seal mechanism and the rotor in the axial direction.

4. The rotary electric machine according to claim 3, wherein
   second seal mechanisms are disposed on sides opposite to the rotor with respect to the bearings in the axial direction, and
   the second seal mechanisms electrically insulate the rotor shaft and the case from each other.

5. The rotary electric machine according to claim 4, wherein
   the first seal mechanism and the second seal mechanism each includes
     a seal portion that faces the rotor shaft or a rotary member rotating integrally with the rotor shaft, and
     a seal holding portion that is disposed on an outer peripheral side of the seal portion and holds the seal portion, and
   an electrical insulating portion is provided between the seal holding portion and the case.

6. The rotary electric machine according to claim 5, wherein
   the electrical insulating portion includes a first electrical insulating layer provided at a portion of the seal holding portion facing the case.

7. The rotary electric machine according to claim 5, wherein
   the electrical insulating portion includes a second electrical insulating layer provided at a portion of the case facing the seal holding portion.

8. The rotary electric machine according to claim 1, wherein
   the case includes a cooling portion that is provided on the opposite side of the rotor with respect to the stator and cools the stator.

* * * * *